March 22, 1960 — E. VAN HAAFTEN — 2,929,139
ROTOR FOR ELECTRIC RAZORS
Filed June 20, 1957 — 2 Sheets-Sheet 1
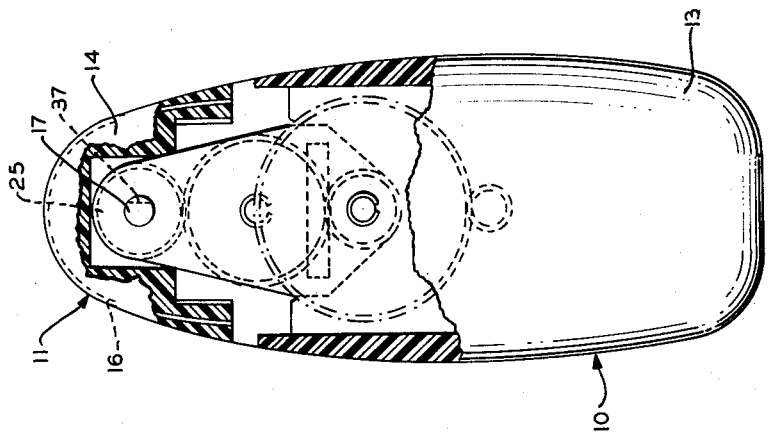
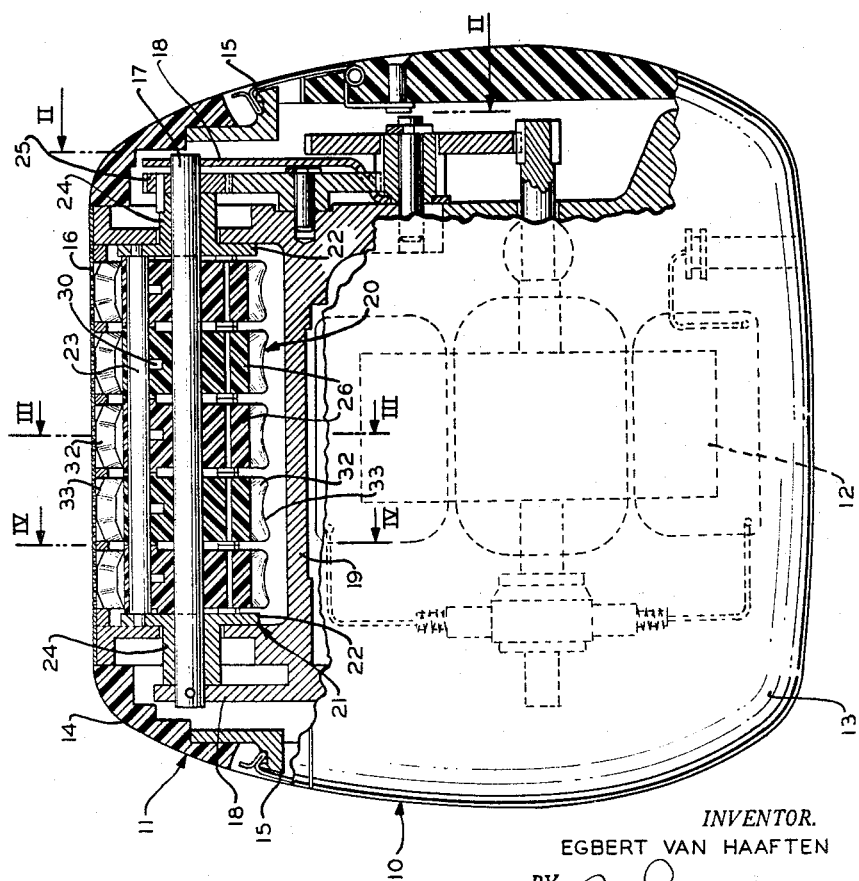
INVENTOR.
EGBERT VAN HAAFTEN
BY
ATTORNEY March 22, 1960  E. VAN HAAFTEN  2,929,139
ROTOR FOR ELECTRIC RAZORS
Filed June 20, 1957  2 Sheets-Sheet 2
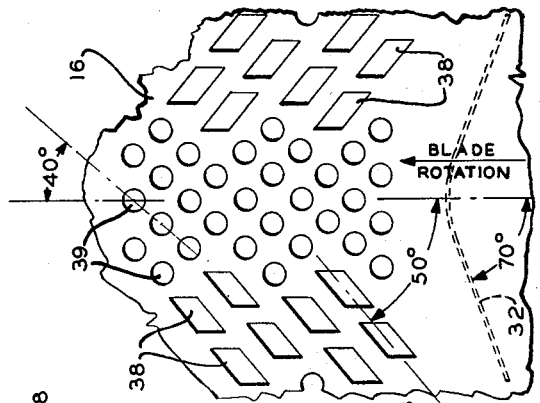
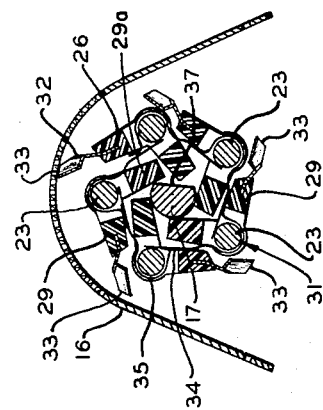
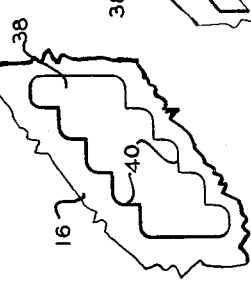
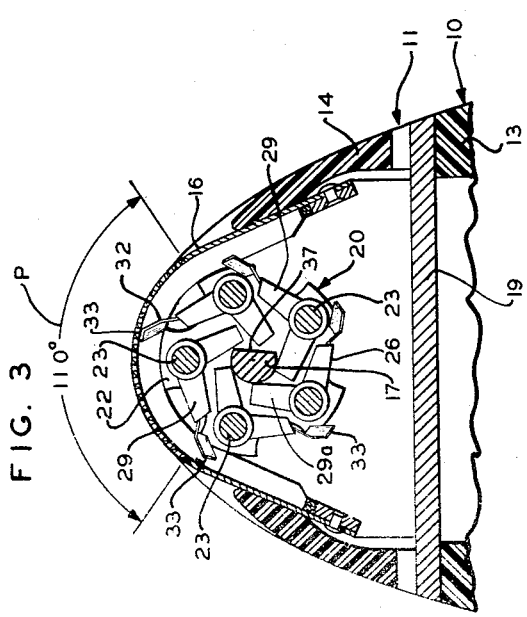
INVENTOR.
EGBERT VAN HAAFTEN
BY
ATTORNEY

United States Patent Office 2,929,139
Patented Mar. 22, 1960

2,929,139

ROTOR FOR ELECTRIC RAZORS

Egbert Van Haaften, Lancaster, Pa., assignor to Bulova Watch Company, Inc., Flushing, N.Y., a corporation of New York Application June 20, 1957, Serial No. 666,828

3 Claims. (Cl. 30—43)

This invention relates to a rotor for electric razors and includes the construction of blades and blade holders which constitute a part of the rotor.

Fundamentally the invention is applicable to electric razors wherein the rotor has a revolving motion continuously in one direction or with rotors which oscillate, the difference in operation involving only the angular disposition of the blades with respect to the grill; oscillating blades are disposed radially of the grill so as to shear when moved in both directions. The arbitrarily selected showing herein is for a rotor that has a continuous rotation so that the blades are sloped forwardly in the direction of rotation. In either event, the grill provides a portion which is a segment of a cylinder and it is against the grill at that segment that the blades must make contact in order to be effective upon the hair growth being shaved.

Both in the present invention and in the prior art, the grills are made as thin as possible commensurate with necessary strength to maintain the grill in shape. However, in order to shear as close as possible to the base of the hair, the grill is made so thin that it will deflect or dent inwardly toward the blade from pressure exerted by the user while shaving. Even through the grill possesses adequate resiliency to return it to shape when the pressure is removed, yet it is while the deflection is present that shaving is expected to take place by the blade or blades passing over the deflection. In the prior art, with blades each coextensive with the cylindrical perforate portion of the grill, a deflection of the grill makes a hill over which the blade edge has to ride, and since the blades are each longitudinally rigid, most of the blade edge is pushed away from the grill as the one spot rides over the hill, and shaving takes place only at that one spot until pressure is released and the grill returns to its cylindrical shape thereat. Also, where the hill raises the blade very slightly from the grill, hair will be caught and pulled rather than being cut, much to the discomfort of the user of the razor. Another serious bad feature of prior art razors is the fact that the spring pressure has to be proportioned to the entire length of the blade, and when a hill occurs in the grill the entire force of the spring is concentrated at that spot with increased wear thereat, and as a spot wears it dents more readily and aggravates wear at that spot.

In its broad aspect, the invention is directed to provide a structure overcoming the above-explained inadequacies of previously marketed electric razors.

Likewise of general purport, the invention provides means for overcoming ill effects or grill distortion.

More precisely, the invention provides for an improved construction obtaining blade engagement coextensive with the effective grill length even though regularity of the grill is disturbed by a hill at some local spot.

Another object of the invention is to provide a plurality of blades having end-to-end alignment or location, each individually movable and adapted to follow the perforate portion of the grill independent of displacement of any other blade in following the contour of the portion of the grill area swept thereby.

Yet another object of the invention is to provide an improved construction agreeable to use of blades having spring-loading individual to each blade and with the blades arranged in end-to-end alignment.

An essential object of the invention is to restrain the several blades from contact with the grill except at the area of the grill which is perforated and constitutes the shaving area of said grill.

A further important object of the invention is to provide individual blades the body portions of which have end-to-end alignment parallel to the axis of the rotor, but having grill-engaging edges that will effect a slicing cut.

A still further object of the invention is to provide a compact assembly of blade-holders operable within the usual radial distance of the rotor axis to the cylindrical portion of the grill.

Yet another object of the invention is to provide a structure with movable blades which will rotate in perfect balance and avoid vibration and maintain a low noise level.

While certain outstanding objects of the invention are mentioned above, other objects, advantages and beneficial constructional features will appear to persons skilled in the art to which the invention appertains as the description proceeds, both by direct recitation thereof and by implication from the context.

Referring to the accompanying drawings, in which like numerals of reference indicate similar parts throughout the several views;

Figure 1 is a view of an electric razor incorporating the novel construction rotor of the present invention, showing the same partly in elevation and partly in section on a plane through the middle thereof and looking toward what will be herein arbitrarily termed the front of said razor;

Figure 2 is an end edge view also partially in section as upon line II—II of Fig. 1;

Figures 3 and 4 are sectional views taken on lines III—III and IV—IV respectively of Fig. 1;

Figure 5 is a perspective view of one of the blades assembled in its holder and also showing in proximity thereto the leaf-spring to be applied to the holder in final assembly of the rotor;

Figure 6 is a cross-section of the cage and of the stationary axle about which it rotates in use;

Figure 7 is a face view of a fragmentary part of the grill; and

Figure 8 is a much enlarged view of a small part of the grill showing the character of the slot openings thereof.

For orienting the present invention, it is initially pointed out that electric razors in general are made with a body portion for housing a motor, and at the upper end of the body portion provide a head construction which has a grill at the top thereof and a blade or blades within the grill movable with respect thereto for shearing whiskers or the like entering through the grill as said upper end of the head construction is pressed against and moved upon the hairy surface being shaved. The blades are carried by or constitute a part of a rotor by which they are either oscillated back and forth or continuously revolved. In the present showing, a continuously revolving rotor has been selected as the preferred construction, but without necessarily restricting the invention thereto. In further explanation, reference to the razor embodying the present invention in the description which continues hereinbelow, the directional designations of top, bottom, sides, front and back and so forth are to be understood as arbitrary and used only as applying to the razor or its parts in the position selected for illustration in the drawing, and not to be considered restrictive as to construction or positioning of the shaver or its constituent parts.

Resorting to the use of such arbitrary terminology, the electric razor as illustrated comprises a bottom section 10 and a top section 11 constituting what are generally termed the body portion and head construction respectively. Said body portion includes an electric motor 12 and a suitable enclosure or casing 13 therefor. The head construction includes a cap 14 which fits on the top of said casing as a continuation thereof and is releasably held thereon by resilient latches 15. The greater part of the top or nose end of said cap is open and a grill 16 protrudes therefrom, the protruding upper portion of said grill being a segment of a cylinder and perforate to admit whiskers to enter therein, the lower margins of the grill being included within the said cap and suitably secured.

The head construction also includes a rotor 20 within said cap and grill, the rotor having blade-mounting means as a part thereof and blades for effecting a sweep in a direction circumferentially of the inside of the cylindrical segment of the grill. As shown, the blades are mounted to continuously revolve and have a repetitive sweep always in the same direction. Considering the construction more in detail, a shaft 17 is provided coaxial with the cylindrical segment of the grill 16, said shaft being non-rotatable, and here shown as carried by brackets 18 at its opposite ends. Said brackets are in turn fixed with respect to a base plate 19 which constitutes the bottom of the head construction and is secured, removably, across the top of body casing 13. A rotor, designated generally by numeral 20, is rotatably mounted on said shaft 17, and a suitable train of gearing or other driving connection is provided from the motor 12 to actuate said rotor for the type of movement, continuously rotating or oscillating, desired. Both types of drive are known in the art, so further description thereof is not deemed necessary except to say that the particular drive herein shown is for continuous rotation of the rotor in one direction.

Rotor 20 has a main body in the form of a cage 21 constituted by parallel end plates 22 connected by a plurality of rods 23 secured at their ends near the peripheries of said plates and parallel to each other and to the shaft 17. Said rods are arranged in a cylindrical series and are all at equal distances from said shaft whereby the cylindrical series is coaxial with the said shaft, and consequently may revolve in perfect balance about said shaft. The end plates 22 have hub-like bearings 24 coaxial therewith and projecting outwardly therefrom, said bearings appropriately supporting the cage 21 rotatively on said shaft 17. One of said bearings 24 is here shown as having a gear 25 fixed thereto exemplary of the driving connection to the rotor from the motor.

Each rod 23 has a longitudinal series of blade-holders 26 mounted thereon in end-to-end arrangement, and therefore with all rods and their holders considered, there is an annular series of longitudinal series of blade-holders in the rotor. Each of these blade-holders is rotatable upon its rod and each is adapted to have a limited rotation independent of rotation of a next adjacent or any other one of said blade-holders, but all are revolved in unison by rotation of the cage.

Said blade-holders 26 are all of like construction, one being shown considerably enlarged in Fig. 5, and description of this one will accordingly suffice for all. In the form depicted, the blade-holder provides a hub or trunnion portion 27 which has an appropriate longitudinal hollow or bore 28 for enabling it to be applied upon its rod with a rotative fit thereon. Wings 29 and 29a project radially from said trunnion portion 27, two such wings being provided for each holder with one transverse to the other at an angular relation of a little over 90°. Midway of the trunnion, both it and adjoining portions of the wings provide a slot 30 transverse to the axis of the trunnion to receive a leaf-spring 31.

One of the wings 29 of each blade holder 26 carries an individual blade 32, that wing and the blade sloping from the supporting rod outwardly of the cage 21 away from shaft 17, said blade being at the outer end of said wing. As a convenience in manufacture, the holder may be a solidified or hard plastic in which the blade is embedded during the moulding or formative stage of said holder such that the heel of the blade will be gripped and securely held by the solidified plastic whereas the leaf portion of the blade projects from the end of said holder and provides a forward cutting edge 33. Said leaf portion is made somewhat concave about a forwardly extending axis and the forward cutting edge 33 extends most forwardly at its middle part and slopes back somewhat at lateral parts thereof so that the entire forward cutting edge, taking into consideration both the concave curvature and the slope, will make contact with the inner cylindrical surface of the grill throughout the length of said cutting edge for the entire width of the blade. The blade is preferably made of steel and provides a sharpened forward shearing or cutting edge 33 and is, at its leaf portion as wide as the wing, and as near as practical the leaf portions of successive blades of holders on any one rod 23 are side by side and provide a substantial continuity of blade edges for the full length of the perforate cylindrical portion of the grill, although wavy in character and therefore capable of effecting varying angular approach to the cooperating shearing edges of the grill perforations and engaging whiskers projecting through the grill and making both a slicing and shearing cut. Slight projection of the trunnion portion of one or both ends thereof beyond the side edge of the wings may be provided for securing independent operative clearance for the wings and blades.

A leaf-spring 31 is provided for each blade holder, a lip end 34 of said spring engaging under the blade-carrying wing 29 contiguous to slot 30 thereof, said spring having a loop 35 to the rear of the lip and the loop passing over the rod 23 thereat within the slot. From this loop, the spring has a tail 36 which extends to and under the rod 23 next following in sequence in the annular series of rods of the cage 21. The spring thus formed and located exerts a resilient pressure on the blade-carrying wing 29 tending to swing the wing toward the grill and sufficing to hold the blade edge 33 in shearing and cutting contact with the grill at the perforate cylindrical segment thereof.

The other wing 29a of the pair of wings constitutes a control for maintaining location of and/or swinging the blade holder 26, and is in effect a cam follower, and projects inwardly from its supporting rod 23 toward the central shaft 17 into tangential engagement with said shaft. Said shaft is, however, appropriately narrowed, as by a flat 37 chordally thereof which therefore will permit the control or follower wing 29a to be under influence of the spring pressure and released from engagement with the shaft, thereby permitting that wing to swing inwardly, if necessary, from its angular disposition were riding on the cylindrical part of said shaft. Said flat 37 is located at that part of the circumference of the shaft 17 which would normally be engaged by the follower wing 29a of a holder 26 while the blade 32 is making its sweep across the cylindrical perforate segment of the grill 16, herein indicated by the circumferential distance along the grill subtended by angle P in Fig. 3. This construction accordingly provides a relaxation on outward swing imposed upon the cam follower wings 29a while the blades sweep the perforate segment of the grill and therefore permits the blades to swing, if necessary, outwardly into contact with the grill while sweeping across the perforate cylindrical segment thereof, but for the rest of the cycle the blades are under the restraining influence of the cam follower wings engaging the cylindrical portion of shaft 17. The construction of parts is such that when functioning normally, the blade edges 33 travel in a substantially true cylindrical path throughout their revolving cycle.

It will be observed that said shaft 17 has as one of its functions the above-described restraining and releasing action upon operating location of the blade holders 26, and while this may conveniently be accomplished by means of a flat on said shaft, other cam formation for the shaft may be provided if desired. Furthermore it may be emphasized that outward location of the blades while toward the grill is defined by contact of each blade with the cylindrical inner surface of the grill and restrained for the rest of the cycle by the cylindrical part of the shaft which keeps the blade shearing edge at substantially the same radial projection as it continues beyond the cylindrical surface of the grill, so that when the blade is in its continued cycle comes again to the cylindrical segment of the grill it will project only substantially as far as the cylindrical surface and will be eased onto it without a click and normally with substantially no change of radial displacement and in any event with only infinitesimal displacement. Attention is directed to the fact that should pressure on the grill dent it inwardly, thereby producing a hill on the inner cylindrical surface, the particular blade approaching that hill can ride over it merely by swing of the individual holder 26 moving the cam follower wing 29a in a direction outwardly from the flat 37, the other holders of that longitudinal series not being disturbed from their normal engagement with the cylindrical surface of the grill segment.

It is also important to note that each blade, as it traverses the grill, leans in a forward direction. Consequently the retarding effect of engagement of the cutting edge 33 of the blade against whiskers entering through the grill, produces a moment of force tending to swing the blade into tighter engagement with the grill, thus automatically augmenting the spring tension and enabling use of a spring 31 exerting minimum pressure of the blade against the grill, which is conducive to cooler operation and less discomfort to the user.

The curved cutting edge 33 of the blade 32 is especially advantageous when used with a grill 16 of the character more particularly shown in Figs. 7 and 8. There it will be observed that perforations of the grill comprise alternate oppositely sloped series of slots 38 and between those series are series of holes 39. It will be appreciated that sliding a grill over a hairy surface, the longer stubble tends to lie down and is not readily engaged in the usual small holes of electric-razor grills, and yet, by provision of slots 38, such stubble will have opportunity to rise and enter the grill therethrough. By having series of said slots sloping opposite to each other, stubble promiscuously flattened will find one or another of the slots near enough parallel thereto as to permit the hair to lift at its outer end into the slot and be sheared or cut. Shorter stubble will readily enter the holes 39 which therefore assure a close shave. It may further be pointed out that the series of slots are at an angle of 50° to the direction of rotation of the blades and the series of holes are at an angle of the order of 40°. The blade edges slope at a greater angle, approximately 70° and therefore have a diagonal relation to the slots in traversing the same from a near corner to a far corner thereof and therefore operate upon the whisker with a slicing cut. While the scale of showing of the slots 38 in Fig. 7 is too small to illustrate the character of the longitudinal edges thereof, Fig. 8, in which one slot is shown very considerably enlarged, depicts said longitudinal edges of the slots as providing a series of steps 40. By this construction, when a whisker is engaged by a cutter blade 32 and pushed to the side of the slot 38, it will lodge at the place of contact at one of the steps 40 and be cut thereat, rather than being slid to an end of the slot before shearing would take place.

I claim:

1. A rotor for electric razors comprising a fixed shaft and a rotatable cage on the shaft, said cage having an annular series of rods parallel to each other and to said shaft, a longitudinal series of blade holders carried by and hinged on each rod of said series of rods, a blade carried by each blade holder of the several series of blade holders, each said blade holder having a follower wing directed inwardly of the cage, and means in conjunction with said shaft for engagement by said follower wing for restraining all of the blades of a series of blades during part of a rotative cycle of the rotor cage and for admitting outward and individual swing of the blades of a series during another part of the rotative cycle of the rotor cage.

2. A rotor for electric razors comprising a fixed shaft and a rotatable cage on the shaft, said shaft having a flat thereon within the cage, said cage having an annular series of rods parallel to each other and to said shaft, a longitudinal series of blade holders carried by and hinged on each rod of said series of rods, a blade carried by each blade holder of the several series of blade holders, each said blade holder having a follower wing directed inwardly of the cage to and tangentially of said shaft and having a permitted swing inwardly when juxtaposed to said flat, and individual springs for each of said blade holders for actuating said follower wing toward said shaft to ride thereagainst and be affected by the contour thereof.

3. A rotor for electric razors comprising a fixed shaft and a rotatable cage on the shaft, said cage having an annular series of rods parallel to each other and to said shaft, a longitudinal series of blade holders carried by and hinged on each rod of said series of rods, each blade holder having a blade-carrying wing and a follower wing, said blade-carrying wing sloping outwardly of the cage and the follower wing sloping inwardly of the cage, the follower wings of each series of holders having an overlapping relation to the shaft and interposed between said shaft and a next adjacent series of blade-carrying wings thereby obtaining a compact nesting of wings, and a blade carried by and projecting from the outer end of each blade-carrying wing.

References Cited in the file of this patent

UNITED STATES PATENTS

| | | |
|---|---|---|
| 926,509 | Rankin | June 29, 1909 |
| 2,055,517 | Branstetter | Sept. 29, 1936 |
| 2,220,911 | Khalil | Nov. 12, 1940 |
| 2,289,323 | Dettle | July 7, 1942 |
| 2,499,249 | Jay | Feb. 28, 1950 |
| 2,508,570 | Graves | May 23, 1950 |
| 2,592,198 | Seeley et al. | Apr. 8, 1952 |
| 2,618,055 | Robertson | Nov. 18, 1952 |